United States Patent
Rodriguez

(10) Patent No.: US 6,408,584 B1
(45) Date of Patent: Jun. 25, 2002

(54) PRE-FABRICATED WOOD UNDERLAYMENT AND TILE SYSTEM

(76) Inventor: Rhonda Annette Rodriguez, 3 Austin Ave., C'ville, IL (US) 60110

( * ) Notice: Subject to any disclaimer, the term of this patent is extended or adjusted under 35 U.S.C. 154(b) by 0 days.

(21) Appl. No.: 09/451,218

(22) Filed: Nov. 29, 1999

(51) Int. Cl.⁷ .................................................. E04F 13/08
(52) U.S. Cl. ........................ 52/390; 52/392; 52/403.1; 52/480; 52/592.1; 52/783.1; 52/796.11
(58) Field of Search ....................... 52/390, 392, 403.1, 52/480, 592.1, 783.1, 796.11; 428/537.1

(56) References Cited

U.S. PATENT DOCUMENTS

| | | | | |
|---|---|---|---|---|
| 3,579,941 A | * | 5/1971 | Tibbals | 52/384 |
| 4,025,676 A | * | 5/1977 | Koellisch | 428/40 |
| 4,295,319 A | * | 10/1981 | Griffin | 52/783.1 |
| 4,543,765 A | * | 10/1985 | Barrett | 52/747 |
| 5,167,991 A | * | 12/1992 | Lowe | 427/267 |
| 6,128,793 A | * | 6/1999 | Weinstein | 4/631 |

* cited by examiner

Primary Examiner—Beth A. Stephan
Assistant Examiner—Patrick J. Chavez
(74) Attorney, Agent, or Firm—Meroni & Meroni, P.C.; Charles F. Meroni, Jr.

(57) ABSTRACT

A pre-fabricated wood underlayment and tile system comprising, in layers, wood underlayment, layer of adhesive, and a layer of vinyl or ceramic tile with a plastic film protectant that is peeled away after installation which provides a pre-fabricated panel to be attached to any flat surface such as a floor or a wall.

8 Claims, No Drawings

PRE-FABRICATED WOOD UNDERLAYMENT AND TILE SYSTEM

BACKGROUND OF THE INVENTION

The invention relates to the installation of wood underlayment and vinyl or ceramic tile. These building materials are commonly used in bathrooms, kitchens and hallways.

The usual method for installation of wood underlayment in locations such as bathrooms or kitchens, involves a layer of underlayment to be nailed or screwed to the surface.

The usual method for installation of vinyl tile would involve a layer of adhesive to be applied to the wood underlayment and then the vinyl tile would be set on underlayment in a pre-determined location.

The usual method for installation of ceramic tile would involve a layer of adhesive to be applied to the wood underlayment and then the ceramic tile would be set on underlayment in a pre-determined location. The adhesive is allowed to cure for a minimum of 24 hours at 70 degrees or above. The tiles then receive a cement based grout material on and into the space between tiles followed by a grout sealer.

In the laying out of tile, the applicator must pre-position a series of tiles, to determine proper spacing and alignment before actually setting the tile for permanent positioning. This procedure takes time and precise calculation.

With many conventional ceramic tiles, there is the need for grouting the space between each tile. Grouting consist of spreading in loose cement material over each line and into the space between the tile. The excess residue left on top of the tile must be thoroughly cleaned, and in tiles that have rough or absorbent surfaces, this procedure can be quite time consuming and labor intensive.

With the present invention preparing the placement of tile, time, and need for precise measurements are conserved because the underlayment and tile units are larger and contain their own pre-spacing and pre-grouting.

When covering irregular areas, the underlayment and tile system can be cut to conform.

The present invention we believe addresses the need for pre-fabricated flooring that is easy to install.

SUMMARY OF THE INVENTION

The invention comprises a pre-fabricated underlayment and tile system to be installed on any flat surface such as a floor or a wall.

The pre-fabricated underlayment and vinyl tile system comprises, in layers, a piece of wood underlayment with tongue and groove interlocking system, a layer of adhesive, a layer of vinyl tile and a plastic film protectant that is peeled away after installation which provides a pre-fabricated panel to be attached to any flat surface such as a floor or a wall.

The pre-fabricated underlayment and ceramic tile system comprises, in layers, a piece of wood underlayment with tongue and groove interlocking system, a layer of adhesive, a layer of ceramic tile, a flexible grout material on and into a pre-spaced and pre-positioned form followed by a grout sealer which provides a pre-fabricated panel to be attached to any flat surface such as a floor or a wall.

Therefore, it is the object of the invention to provide a pre-fabricated wood underlayment and tile system adapted as one unit.

It is the object of the invention to provide a pre-fabricated underlayment and tile system, which can be installed by the "do-it-yourself" homeowners.

It is the object of the invention to provide a clean and fast way to install underlayment and tile.

It is the object of the invention to provide a device that can quickly and easily be secured to, and conform to, a surface of a variety of compositions.

Installation of a pre-fabricated tile and underlayment system of the present invention results in several hours of labor saved.

Installation of a pre-fabricated underlayment and tile system insures uniform installation of tile.

The product according to the application is cleaner, faster, and easier. The product can be appreciated by both the general contractor and the "do-it-yourself" homeowner.

DETAILED DESCRIPTION OF THE INVENTION

The pre-fabricated wood underlayment and tile board of the present invention is typically 24 inches to 48 inches wide, 48 inches to 96 inches long, and one-half inch to one and one-half inch thick.

The pre-fabricated underlayment and vinyl tile system comprises, in layers, a piece of wood underlayment with tongue and groove interlocking system, a layer of adhesive, a layer of vinyl tile and a plastic film protectant that is peeled away after installation which provides a pre-fabricated panel to be attached to a surface of a variety of compositions.

The pre-fabricated underlayment and ceramic tile system comprises, in layers, a piece of wood underlayment with tongue and groove interlocking system, a layer of adhesive, a layer of ceramic tile, a flexible grout material on and into a pre-spaced and pre-positioned form followed by a grout sealer which provides a pre-fabricated panel to be attached to a surface of a variety of compositions.

The first operation to install the pre-fabricated wood underlayment and vinyl tile system is to apply adhesive to the pre-determined area where the wood underlayment and vinyl tile panels are to permanently adhere to a surface of various material makeup.

The final operation is to place the pre-fabricated panel onto the area with adhesive.

The first operation to install the pre-fabricated wood underlayment and ceramic tile system of the present invention is to apply adhesive to the pre-determined area where the wood underlayment and ceramic tile panels are to permanently adhere to a surface of various material makeup.

The next operation of the invention is to place the pre-fabricated panel onto the area with adhesive.

The final step for installing wood underlayment with ceramic tile, apply a flexible grout material with sealer into the joints where the panels connect.

What is claimed is:

1. A pre-fabricated vinyl tile system for use as a floor comprising a plurality of vinyl tile boards connected in interlocking relationship, the vinyl tile boards consisting of:
    (a) a wooden underlayment, the wooden underlayment having a top surface, a bottom surface, two opposed end edges, and two opposed side edges, the bottom surface of the wooden underlayment capable of being attached to floor and wall surfaces;
    (b) interlocking means integrated into and extending along the width of the two opposed end edges of the wooden underlayment for interlocking tile boards longitudinally;
    (c) interlocking means integrated into and extending along the length of the two opposed side edges of the wooden underlayment for interlocking tile boards laterally;

(d) an adhesive layer, the adhesive layer applied to the top surface of the wooden underlayment;

(e) a layer of vinyl tiles having a top surface and a bottom surface placed in a contiguous relationship over the top surface of the wooden underlayment so that the layer of vinyl tiles form a continuous tile floor when the vinyl tile boards are interlocked, the bottom surface of the layer of vinyl tiles adhered to the adhesive layer; and (f) a protective release cover releasably adhered to the top surface of the layer of vinyl tiles, the protective release cover protecting the layer of vinyl tiles during installation of the vinyl tile board.

2. The pre-fabricated vinyl tile system for use as a floor or wall covering of claim 1, wherein the interlocking means extending along the width of the two opposed end edges of the wooden underlayment comprises a tongue on the first edge of the two opposed end edges and a groove on the second edge of the two opposed end edges, the tongue formed to nest in the groove.

3. The pre-fabricated vinyl tile system for use as a floor or wall covering of claim 2, wherein the interlocking means extending along the length of the two opposed side edges of the wooden underlayment comprises a tongue on the first side of the two opposed side edges and a groove on the second side of the two opposed side edges, the tongue formed to nest in the groove.

4. The pre-fabricated vinyl tile system for use as a floor or wall covering of claim 3, wherein the two opposed end edges of the wooden underlayment are from about 24 inches to about 48 inches in width, and the two opposed side edges of the wooden underlayment are from about 48 inches to about 96 inches in length.

5. A pre-fabricated ceramic tile system for use as a floor comprising a plurality of ceramic tile boards connected in interlocking relationship, the ceramic tile boards comprising:

(a) a wooden underlayment, the wooden underlayment having a top surface, a bottom surface, two opposed end edges, and two opposed side edges, the bottom surface capable of being attached to floor and wall surfaces;

(b) interlocking means extending along the width of the two opposed end edges of the wooden underlayment for interlocking tile boards longitudinally;

(c) interlocking means extending along the length of the two opposed side edges of the wooden underlayment for interlocking tile boards laterally;

(d) an adhesive layer, the adhesive layer applied to the top surface of the wooden underlayment;

(e) a layer of ceramic tiles having a top surface and a bottom surface placed over the top surface of the wooden underlayment and spaced apart by a pre-determined distance so that the layer of ceramic tiles form a continuous tile floor when the ceramic tile boards are interlocked, the bottom surface of the layer of ceramic tiles adhered to the adhesive layer;

(f) a flexible grout material placed in the pre-determined distance between the ceramic tiles;

(g) a grout sealer applied to the flexible grout material; and (h) a protective release cover releasably adhered to the top surface of the layer of ceramic tiles and flexible grout, the protective release cover protecting the layer of ceramic tiles and flexible during installation of the ceramic tile board.

6. The pre-fabricated ceramic tile system for use as a floor or wall covering of claim 5, wherein the interlocking means extending along the width of the two opposed end edges of the wooden underlayment comprises a tongue on the first edge of the two opposed end edges and a groove on the second edge of the two opposed end edges, the tongue formed to nest in the groove.

7. The pre-fabricated ceramic tile system for use as a floor or wall covering of claim 6, wherein the interlocking means extending along the length of the two opposed side edges of the wooden underlayment comprises a tongue on the first side of the two opposed side edges and a groove on the second side of the two opposed side edges, the tongue formed to nest in the groove.

8. The pre-fabricated ceramic tile system for use as a floor or wall covering of claim 7, wherein the two opposed end edges of the wooden underlayment are from about 24 inches to about 48 inches in width, and the two opposed side edges of the wooden underlayment are from about 48 inches to about 96 inches in length.

* * * * *